G. L. Bailey,
Furniture Caster.
Nº 12,578.     Patented Mar. 20, 1855.
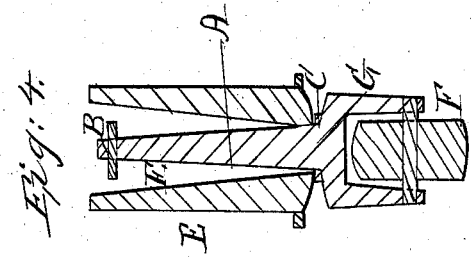
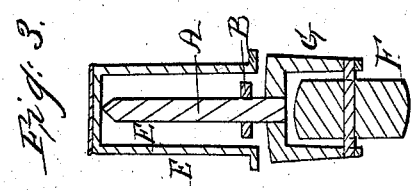
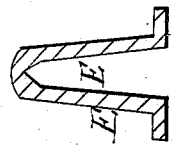
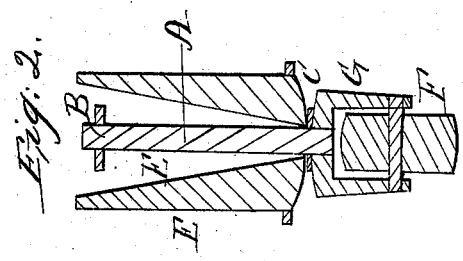
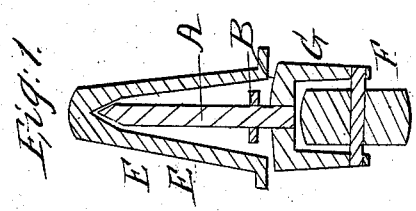

UNITED STATES PATENT OFFICE.

GILBERT L. BAILEY, OF PORTLAND, MAINE, ASSIGNOR TO G. L. BAILEY AND M. NUTTING.

CASTER FOR FURNITURE.

Specification of Letters Patent No. 12,578, dated March 20, 1855.

*To all whom it may concern:*

Be it known that I, GILBERT L. BAILEY, of Portland, county of Cumberland, State of Maine, have invented a new and Improved Mode for Casters; and I do hereby declare that the following is a full and exact description thereof, reference being had to the accompanying drawings and to the letters of reference marked thereon.

The nature of my invention consists of making a new and improved mode for casters.

To enable others skilled in the art to make and use my invention, I will proceed to describe its construction and operation.

I construct my casters as seen in Figures 1, 2, 3, and 4. I make a straight truck frame G with the spindle A made straight or tapering as shall be found best to apply into a tapering hole E as seen in Figs. 1 2 and 4—also to apply into a straight hole E as seen in Fig. 3. Said spindle A has a pin B through it or oval guide B applied on it near the bottom as seen in Fig. 1—or near the top as seen in Fig. 2 or the spindle A may be oval instead of the guide pin B; in Fig. 1 the bearing is on the top of the spindle A; in Fig. 2 the bearing is on the shoulder C near the bottom of the spindle A; the pin or oval guide should be set in a line with the axle or bearing of the truck F, which by its action on the inside of the hole in the socket E E (which is made larger than the spindle A) causes the truck F to keep always in a right position to be moved and also throws it from the center; the truck F is applied to the frame in the usual way; the truck frame G is made straight—which holds the truck, which is different from the usual way.

This improved caster is far preferable to any crooked caster, as it allows the table, sofa or piano, &c., to be moved with greater ease in any direction desired without moving in an oblique direction, as is the case with crooked casters.

What I claim as my invention and desire to secure by Letters Patent is—

The pin B or oval guide put through or applied to the spindle A in any manner or its equivalent, and attached to a straight truck frame G, with a socket hole E larger than the spindle A, in the manner and for the purpose substantially as herein described and set forth.

In testimony whereof, I have hereunto subscribed my name.

GILBERT L. BAILEY.

Witnesses:
E. L. BOOTHBY,
CHR. HOLDEN.